US008968072B2

(12) United States Patent
Osawa et al.

(10) Patent No.: US 8,968,072 B2
(45) Date of Patent: Mar. 3, 2015

(54) GAMING MACHINE AND CONTROL METHOD THEREOF

(75) Inventors: Akira Osawa, Tokyo (JP); Kenta Kitamura, Tokyo (JP); Takeshi Iso, Tokyo (JP); Tatsuya Teranishi, Tokyo (JP)

(73) Assignees: Universal Entertainment Corporation, Tokyo (JP); Aruze Gaming America, Inc., Las Vegas, NV (US)

(*) Notice: Subject to any disclaimer, the term of this patent is extended or adjusted under 35 U.S.C. 154(b) by 808 days.

(21) Appl. No.: 13/151,821

(22) Filed: Jun. 2, 2011

(65) Prior Publication Data

US 2012/0309492 A1 Dec. 6, 2012

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.

CPC ............ *G07F 17/3213* (2013.01); *G07F 17/32* (2013.01)

USPC .................. 463/20; 463/16; 463/17; 463/18; 463/19; 463/21; 463/30

(58) Field of Classification Search

CPC . G07F 17/3241; G07F 17/3227; G07F 17/32; G07F 17/3202; G09B 5/06; G09B 15/04; A63F 11/00; A63F 3/065

USPC ........................ 463/16, 17, 18, 19, 20, 21, 30

See application file for complete search history.

(56) References Cited

U.S. PATENT DOCUMENTS

| | | | | |
|---|---|---|---|---|
| 5,752,881 | A | 5/1998 | Inoue | |
| 5,800,264 | A * | 9/1998 | Pascal et al. | 463/16 |
| 6,471,387 | B1 * | 10/2002 | Henshaw et al. | 362/555 |
| 7,380,791 | B2 * | 6/2008 | Gauselmann et al. | 273/142 B |

* cited by examiner

*Primary Examiner* — Adetokunbo O Torimiro

(74) *Attorney, Agent, or Firm* — KMF Patent Services, PLLC; S. Peter Konzel; Kenneth M. Fagin

(57) ABSTRACT

A gaming machine and a controlling method thereof are provided. The gaming machine includes a mechanical symbol display unit which includes: a rotatable reel having a peripheral face with a plurality of symbols thereon; an illuminating device that is provided within a space on an inner periphery side of the rotatable reel and is controlled to emit light of at least two different colors; and an illumination controller. The symbols include a special symbol having at least two translucent portions each having a unique color that is the same as one of the at least two different colors. The at least two colors are selected in a way that, the special symbol is observable as a symbol in one single color or a symbol with a pattern of at least two colors according to the color of the emitted light.

14 Claims, 17 Drawing Sheets

| | FIRST SYMBOL COLUMN | SECOND SYMBOL COLUMN | THIRD SYMBOL COLUMN | FOURTH SYMBOL COLUMN | FIFTH SYMBOL COLUMN |
|---|---|---|---|---|---|
| CODE NO | SYMBOL | SYMBOL | SYMBOL | SYMBOL | SYMBOL |
| 00 | JACKPOT 7 | JACKPOT 7 | JACKPOT 7 | JACKPOT 7 | JACKPOT 7 |
| 01 | PLUM | BELL | CHERRY | ORANGE | APPLE |
| 02 | ORANGE | APPLE | ORANGE | PLUM | ORANGE |
| 03 | WILD | WILD | WILD | WILD | WILD |
| 04 | ORANGE | CHERRY | ORANGE | BELL | PLUM |
| 05 | PLUM | ORANGE | PLUM | PLUM | FLAME 7 |
| 06 | ORANGE | PLUM | CHANCE CHERRY | APPLE | ORANGE |
| 07 | PLUM | CHERRY | PLUM | FLAME 7 | APPLE |
| 08 | FLAME 7 | BELL | ORANGE | PLUM | PLUM |
| 09 | CHERRY | APPLE | PLUM | ORANGE | BELL |
| 10 | ORANGE | BELL | ORANGE | BELL | CHERRY |
| 11 | BELL | STRAWBERRY | PLUM | ORANGE | PLUM |
| 12 | ORANGE | PLUM | BELL | PLUM | BELL |
| 13 | STRAWBERRY | FLAME 7 | STRAWBERRY | CHERRY | ORANGE |
| 14 | FLAME 7 | BELL | FLAME 7 | APPLE | APPLE |
| 15 | ORANGE | APPLE | BELL | STRAWBERRY | PLUM |
| 16 | APPLE | BELL | CHERRY | CHERRY | CHERRY |
| 17 | PLUM | STRAWBERRY | PLUM | BELL | ORANGE |
| 18 | ORANGE | PLUM | ORANGE | PLUM | BELL |
| 19 | PLUM | CHERRY | PLUM | ORANGE | ORANGE |
| 20 | FLAME 7 | BELL | ORANGE | CHERRY | PLUM |
| 21 | CHERRY | APPLE | PLUM | PLUM | STRAWBERRY |

FIG. 10

GAMING MACHINE AND CONTROL METHOD THEREOF

TECHNICAL FIELD

The present invention relates to a gaming machine and a gaming machine control method.

BACKGROUND

In general, a slot machine, which is one kind of gaming machine, includes, as an important component thereof, a symbol display unit for variably displaying and stopping a plurality of symbols for each column.

Such slot machines can be roughly divided, based on forms of the symbol display unit, into two types: those adopting a mechanical reel and those adopting a simulated reel as the symbol display unit. The mechanical reel type includes multiple reels having multiple kinds of symbol along the periphery, and the symbols can be variably displayed and stopped by mechanically rotating and stopping the reels. The combination of the stopped symbols may form a winning combination with which a player is awarded. And display effects are performed to amuse a player, as well as to inform the game state.

U.S. Pat. No. 5,752,881 discloses a gaming machine having outer and inner reels and a display window. A plurality of symbols are spaced peripherally about the outer reel. Each of the symbols is transparent with an opaque portion disposed inside and/or outside the transparent symbol. The inner reel is rotatable inside the outer reel. A plurality of different colored patterned portions are disposed in a peripheral series about the inner reel. One of the patterned portions stopped in the display window becomes observable through the transparent portion when the transparent symbol is stopped in the display window and is combined with the transparent symbol.

U.S. Pat. No. 7,380,791 discloses a gaming machine using controllable LEDs for reel strip illumination. A backlight for a reel assembly comprises a plurality of light emitting diodes (LEDs). An array of red, green, and blue diodes are positioned behind a translucent reel strip to backlight three adjacent symbols on a reel strip. The LEDs are individually controllable to vary the color output of the LED array for a full spectrum of colors, including white. Groups of LEDs can be illuminated to optimally illuminate any number of symbols of any size. The LEDs may be controlled to highlight special symbols such as by blinking or changing colors.

SUMMARY

An aspect of the present invention is a gaming machine, which includes: a game controller; and a mechanical symbol display unit controlled by the game controller for displaying a plurality of symbols in such a way that a combination of the symbols randomly selected by the game controller is displayed through a display window and, if the combination of symbols is a predetermined winning combination, a player is awarded a payout, wherein the mechanical symbol display unit includes a rotatable reel having a peripheral face with a plurality of symbols spaced apart peripherally thereon and being controllable to stop to display at least one of the symbols through the display window; an illuminating device provided within a space on an inner periphery side of the rotatable reel, being controllable to emit light of at least two different colors, including a first color and a second color different from the first color; and an illumination controller switching the illuminating device to emit light of the first color and the second color at a predetermined timing, wherein the symbols include a special symbol having at least two translucent portions, including a first translucent portion of the first color and a second translucent portion of the second color; whereby when the color of emitted light is determined selectively, the special symbol stopped in the display window is observable through the display window as a symbol in substantially the same single color as the determined color of emitted light or a symbol with a pattern of at least two colors, according to a combination of the determined color of emitted light and the colors of the at least two translucent portions.

Another aspect of the present invention is a method of controlling a gaming machine, which includes: a game controller and a mechanical symbol display unit, the mechanical symbol display unit including a rotatable reel having a peripheral face with a plurality of symbols spaced apart peripherally thereon; an illuminating device within a space on an inner periphery side of the rotatable reel; and an illumination controller, wherein the symbols include a special symbol having at least two translucent portions, including a first translucent portion of a first color and a second translucent portion of a second color different from the first color. The method includes the steps of: displaying a plurality of symbols in such a way that a combination of symbols randomly selected by the game controller is displayed through a display window by stopping the reel; awarding a payout to a player if the combination of symbols is a predetermined winning combination; emitting light of at least two different colors, including the first color and the second color; switching the illuminating device to emit light of the first color and the second color at a predetermined timing; and determining the color of emitted light selectively, so that the special symbol stopped in the display window is observable through the display window as a symbol in the same single color as the determined color of emitted light or a symbol with a pattern of at least two colors, according to a combination of the determined color of emitted light and the colors of the at least two translucent portions.

According to the above aspects of the present invention, it is possible for the display effects performed by the gaming machine with a simple structure to make games lively and easy for a player to grasp.

BRIEF DESCRIPTION OF THE DRAWINGS

FIG. 10 is an explanatory diagram of a data table showing symbols and code Nos. of each symbol.

DETAILED DESCRIPTION

Figure 1:
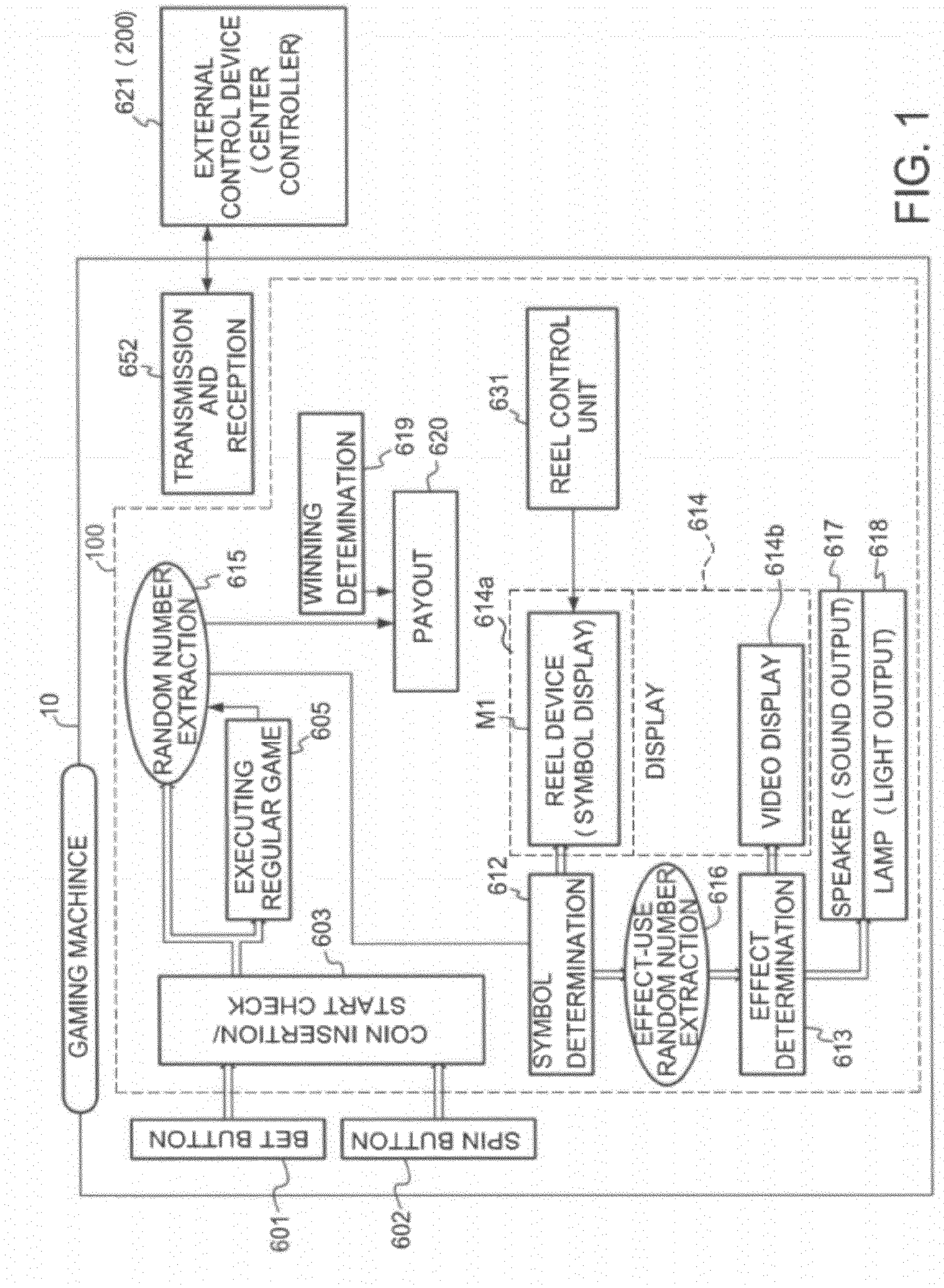
FIG. 1 is an explanatory diagram of a functional flow of a gaming machine.

Embodiments of the invention may be implemented innumerous ways. A detailed description of embodiments is provided below along with accompanying figures. The detailed description is provided in connection with such embodiments, but is not limited to any particular embodiment. The scope is limited by the claims, but numerous alternatives, modifications, and equivalents are encompassed. Numerous specific details are set forth in the following description in order to provide a thorough understanding. These details are provided for the purpose of embodiment, and the descriptions provided may be used for implementation according the claims without some or all of these specific details. For the purpose of clarity, technical material that is known in the technical fields related to the embodiments has not been described in detail to avoid unnecessarily obscuring the description.

(Gaming Machine Overview)

A gaming machine 10 is described. The gaming machine 10 includes a reel device M1 which includes: a rotatable reel M3 having a reel band M32 with a plurality of symbols 501 thereon; an illuminating device M7 that is provided within a space on an inner periphery side of the rotatable reel M3 and is controlled to emit light of at least two different colors; and an illumination controller. The symbols include a special symbol 510 having at least two translucent portions 511, 512, each having a unique color that is the same as one of the at least two different colors. The at least two colors are selected in such a way that the special symbol 510 is observable as a symbol in one single color or a symbol with a pattern of at least two colors according to the color of the emitted light.

The "base game" in the embodiment is executed by the gaming machine 10. The base game is a slot game where a plurality of symbols 501 are rearranged. Note that the base game is not limited to a slot game. The base game may be any type as long as it is independently executable by the gaming machine 10.

Rearrangement of the symbols 501 in the slot game is executed on a reel device M1 (symbol display device). The slot game includes processes of: executing a regular game on condition that a game value is bet, in which regular game the symbols 501 are rearranged on the reel device M1, and a regular payout according to the symbols 501 rearranged is awarded.

The symbols 501 include "special symbol 510." That is, the "symbols 501" is a superordinate concept of the special symbol 510. The special symbol 510 in the embodiment corresponds to symbol "FLAME 7".

The "game value" is a coin, paper money, or electronic value information corresponding to these. Note that the game value in the present invention is not particularly limited. Examples of the game value include game media such as medals, tokens, cyber money, tickets, and the like. A ticket is not particularly limited, and a barcoded ticket may be adopted for example.

The term "rearrange" in this specification means dismissing an arrangement of symbols 501 and arranging them once again. "Arrangement" means a state where the symbols 501 can be visibly confirmed by a player.

(Functional Flow of Gaming Machine)

The gaming machine 10 includes a bet button unit 601, a spin button unit 602, a display unit 614, and a game controller 100 which controls these units. Note that the bet button unit 601 and the spin button unit 602 each are a kind of input device. Further, the gaming machine 10 includes a send-receive unit 652 which enables data communication with the external control device 621.

The bet button unit 601 has a function of accepting a bet amount through player operation. The spin button unit 602 has a function of accepting a start of a game, such as a regular game, through player operation, that is, a start operation. The display unit 614 has functions of displaying still-image information and moving-image information. Examples of the still-image information are various types of symbols 501, numeral values, and signs. Examples of the moving-image information include effect video. The display unit 614 has a symbol display region 614*a*, and a video display region 614*b*. The symbol display region 614*a* has a reel device M1 and displays symbols 501. The video display region 614*b* displays various types of effect video information to be displayed during a game, in the form of a moving image or a still image.

The game controller 100 includes: a coin insertion/start-check unit 603; a regular game executing unit 605; a random number extraction unit 615; a symbol determination unit 612; an effect-use random number extraction unit 616; an effect determination unit 613; a speaker unit 617; a lamp unit 618; a winning determination unit 619; and a payout unit 620.

The regular game executing unit 605 has a function of executing a regular game on condition that the bet button unit 601 has been operated.

The symbol determination unit 612 has functions of: determining symbols 501 to be rearranged with a random number given from the random number extraction unit 615; rearranging the determined symbols 501 in the symbol display region 614*a* of the display unit 614; outputting information on rearrangement of the rearranged symbols 501 to the winning determination unit 619; outputting an effect designation signal to the effect-use random number extraction unit 616, based on the rearrangement of the symbols 501.

The effect-use random number extraction unit 616 has the following functions: when receiving the effect instruction signal from the symbol determination unit 612, extracting an effect-use random number; and outputting the effect-use random number to the effect determination unit 613. The effect determination unit 613 has functions of: determining an effect by using the effect-use random number; outputting video information on the determined effect in the video display region 614*b* of the display unit 614; outputting audio and illumination information on the determined effect to the speaker unit 617 and the lamp unit 618, respectively.

The winning determination unit 619 has functions of: determining whether a winning is achieved when information on symbols 501 rearranged and displayed on the display unit 614 is given; calculating an amount of payout based on a winning combination when it is determined that a winning has been achieved; outputting to the payout unit 620 a payout signal which is based on the payout amount. The payout unit 620 has a function of paying out a game value to a player in the form of a coin, a medal, a credit, or the like.

Further, the game controller 100 has a storage unit 661 which stores therein various types of bet amount data. The storage unit 661 is a device which rewritably stores data in a hard-disk device, memory, or the like.

Moreover, the gaming machine 10 has a reel control unit 631. The reel control unit has a function of controlling the reel device M1 to rearrange symbols 501 into a predetermined arrangement.

(Coin Insertion/Start-Check)

First, the gaming machine 10 checks whether the bet button unit 601 and the spin button unit 602 are sequentially pushed by a player in this order.

(Symbol Determination)

Next, when the player presses the spin button unit 602, the gaming machine 10 extracts a random number for symbol determination. Then, for each rotatable reel M3 displayed through the display unit 614, the gaming machine 10 determines symbols 501 to be presented to the player when scrolling of symbol columns is stopped.

(Symbol Display)

Next, the gaming machine 10 starts scrolling a symbol column of each rotatable reel M3, and stops the scroll so that the symbols 501 determined are presented to the player.

(Winning Determination)

Next, when the symbol column of each rotatable reel M3 stops scrolling, the gaming machine 10 determines whether a combination of the symbols 501 presented to the player is a winning combination.

(Payout)

Next, when a combination of the symbols 501 presented to the player is a winning combination, the gaming machine 10 awards the player a benefit according to the combination of the symbols 501.

(Mechanical Structure of Gaming Machine)

Figure 2:
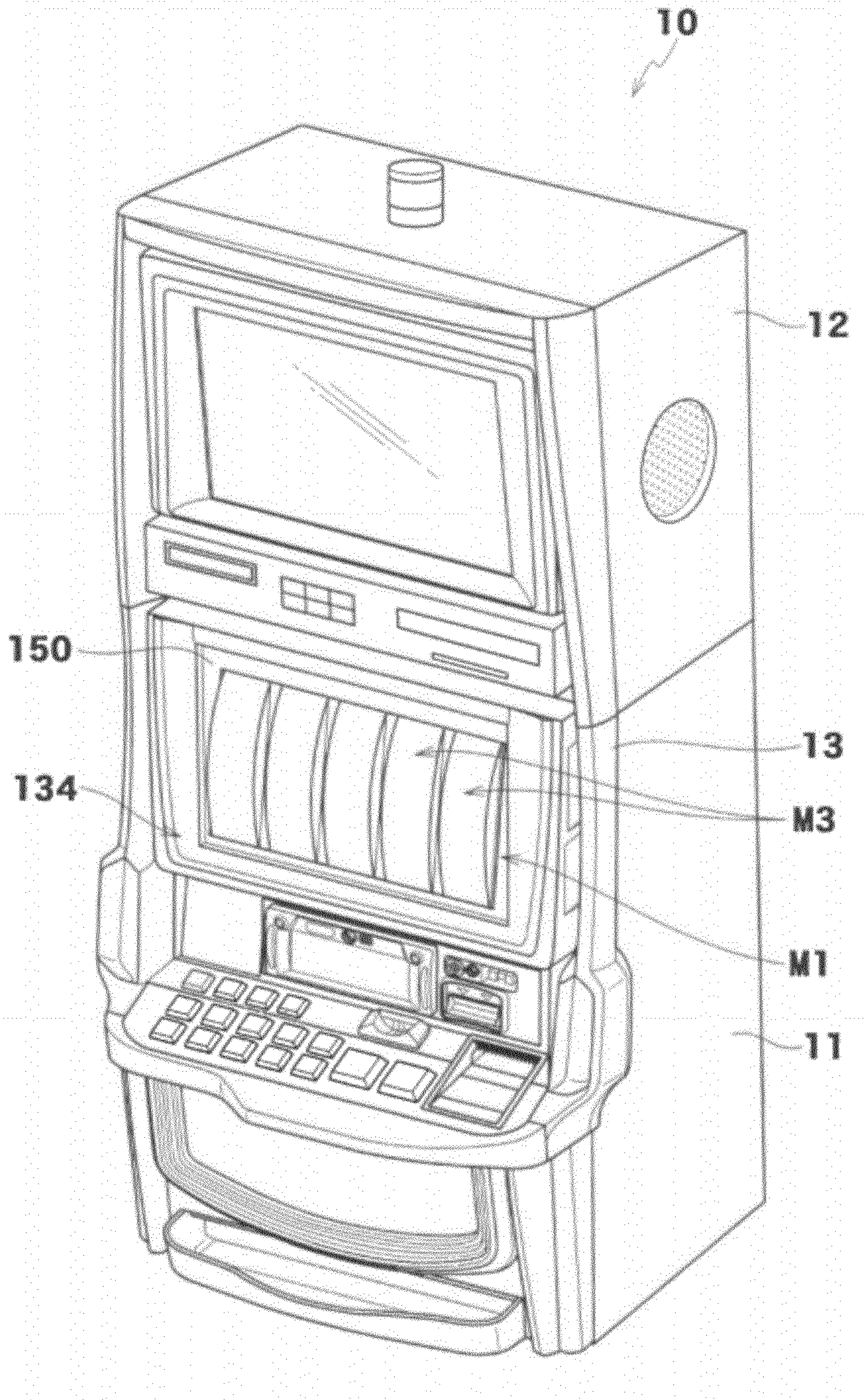
FIG. 2 is a perspective view of a gaming machine.

Here, referring to FIG. 2, the overall structure of the gaming machine 10 is described.

The gaming machine 10 has a cabinet 11, a top box 12 provided above of the cabinet 11, and a main door 13 provided at the front face of the cabinet 11. A reel device M1 is provided within the main door 13. A reel cover 134 is provided to the front of the reel device M1. Furthermore, the reel cover 134 includes a transparent liquid crystal panel or a transparent panel. The reel cover 134 may also include a touch penal. The reel cover 134 includes a display window at the center. It is possible to observe 20 (=5 columns×4 symbols) symbols 501 from the outside through the display window 150. The four symbols 501 observed in each column are part of the symbols 501 arranged on the peripheral face of the rotatable reel M3. For each of the rotatable reels M3, all of the four symbols 501 change speed while moving upward or downward to be displayed. This enables rearrangement in a manner that symbols 501 are rotated and stopped thereafter.

(Reel Device M1)

Figure 3:
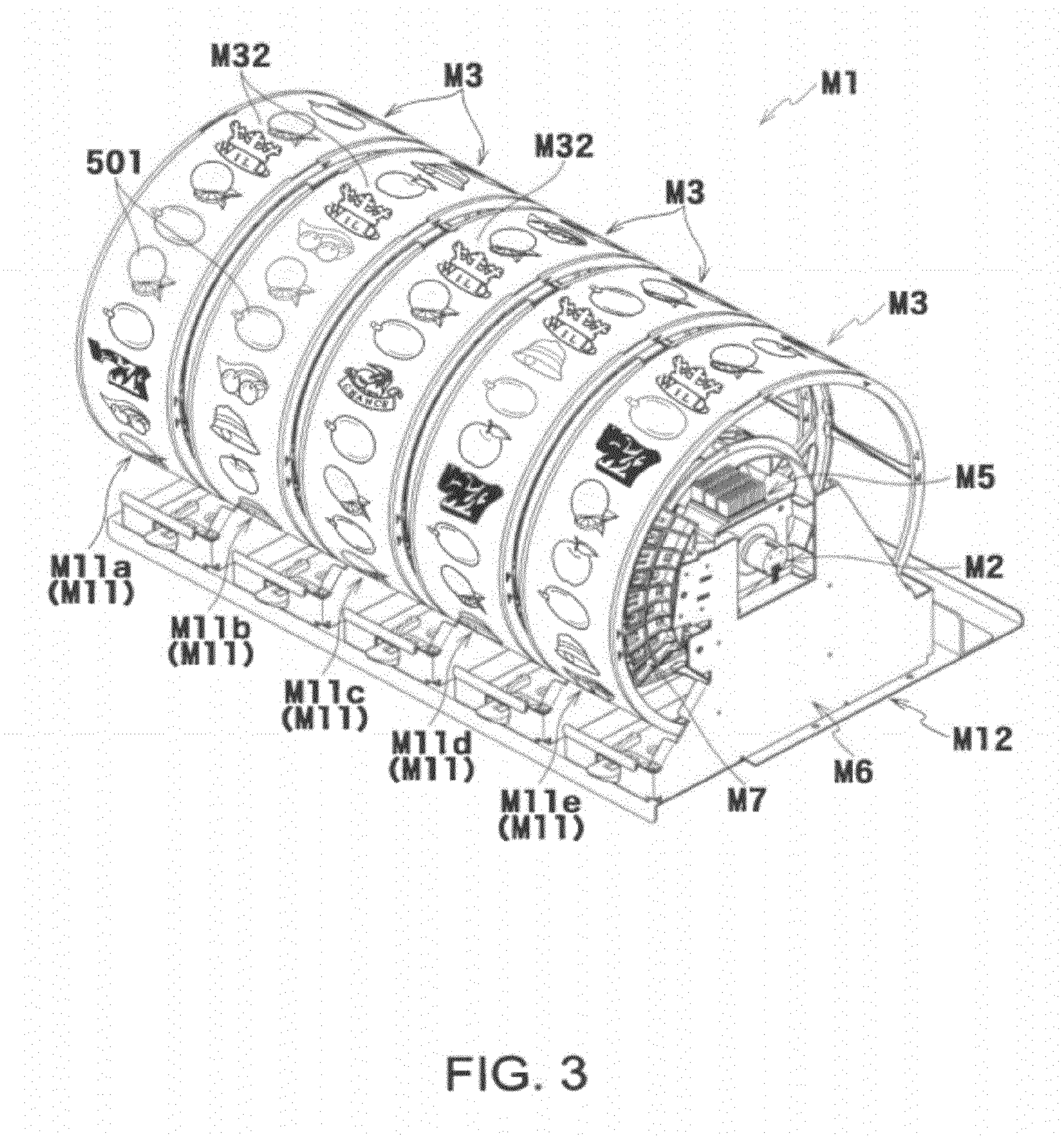
FIG. 3 is a perspective view of a reel device.
Figure 4:
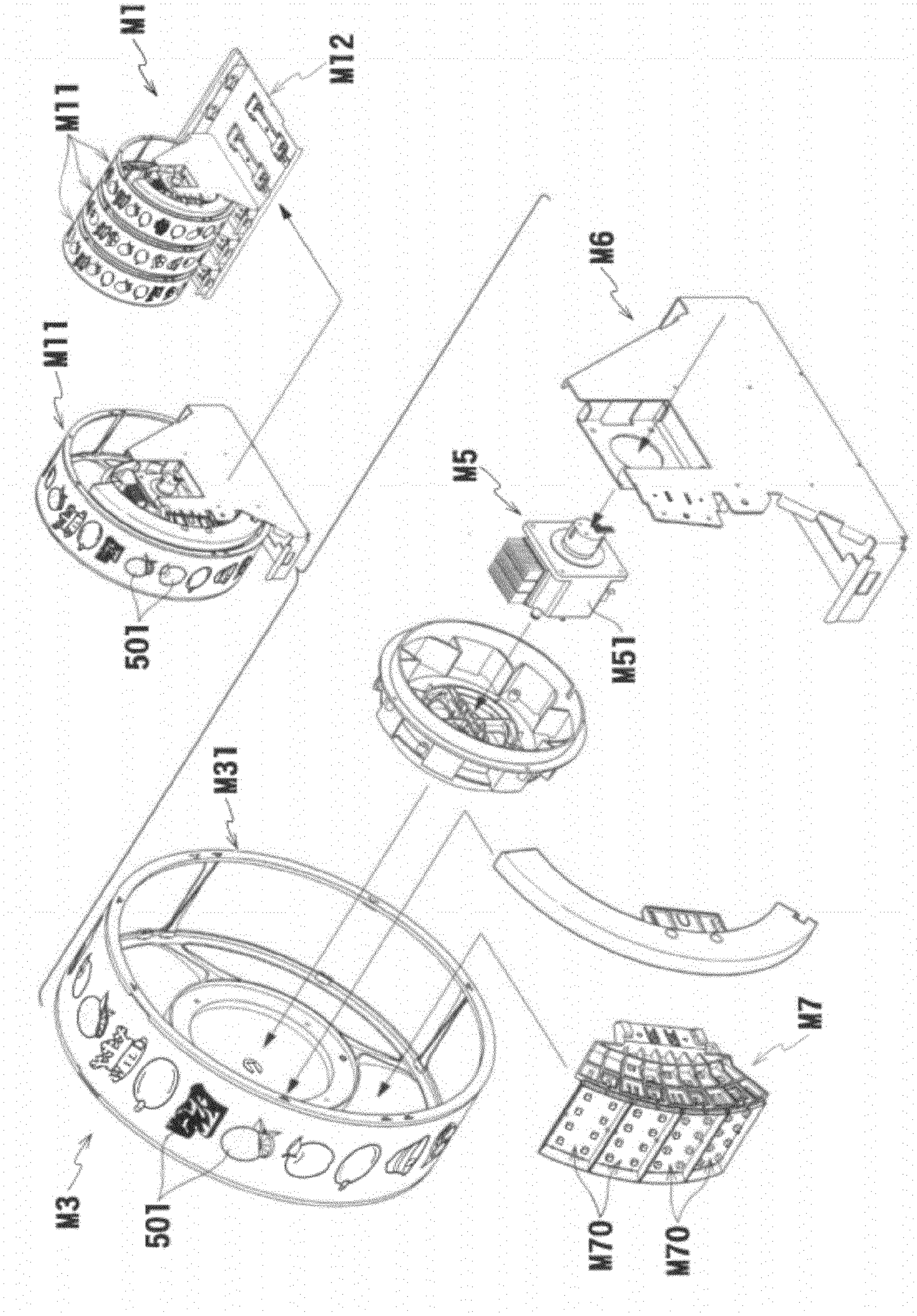
FIG. 4 is an exploded perspective view of a reel device.

As shown in FIGS. 3 & 4, the reel device M1 provided in the gaming machine 10 has a reel unit M11 which rearranges the symbols 501 by driving the rotatable reel M3 on which symbols 501 are arranged, and a reel unit holding mechanism M12 which holds the reel unit M11 in a removable manner. In the following description, in order to specify the position of each reel unit M11, the first to fifth reel units M11 from left to right, viewed from the front of the gaming machine 10, are designated as M11*a* to M11*e*.

(Reel Unit M11)

As shown in FIG. 3, the reel unit holding mechanism M12 holds the reel units M11 in a removable manner. The reel unit M11 includes a rotatable reel M3 having symbols 501 arranged on the peripheral face and a reel support mechanism M6 supporting the rotatable reel M3.

(Reel Unit M11: Rotatable Reel M3)

Figure 5:
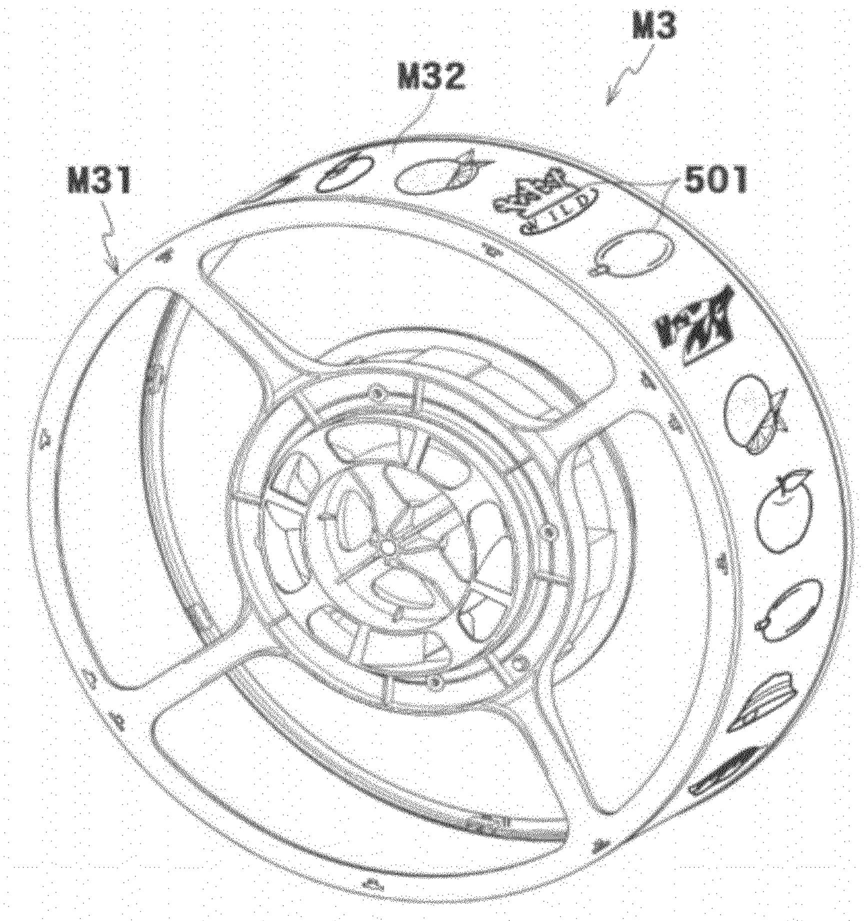
FIG. 5 is a perspective view of a rotatable reel.

As shown in FIG. 5, the rotatable reel M3 includes a circular reel band M32 having at least one symbol 501 arranged thereon and a reel frame M31 having the reel band M32 disposed on the peripheral face thereof. The reel band M32 is formed of translucent material which is light-pervious, such as acrylic resin. The reel frame M31 is formed of material which is light-pervious.

(Reel Unit M11: Illuminating Device M7)

Figure 6:
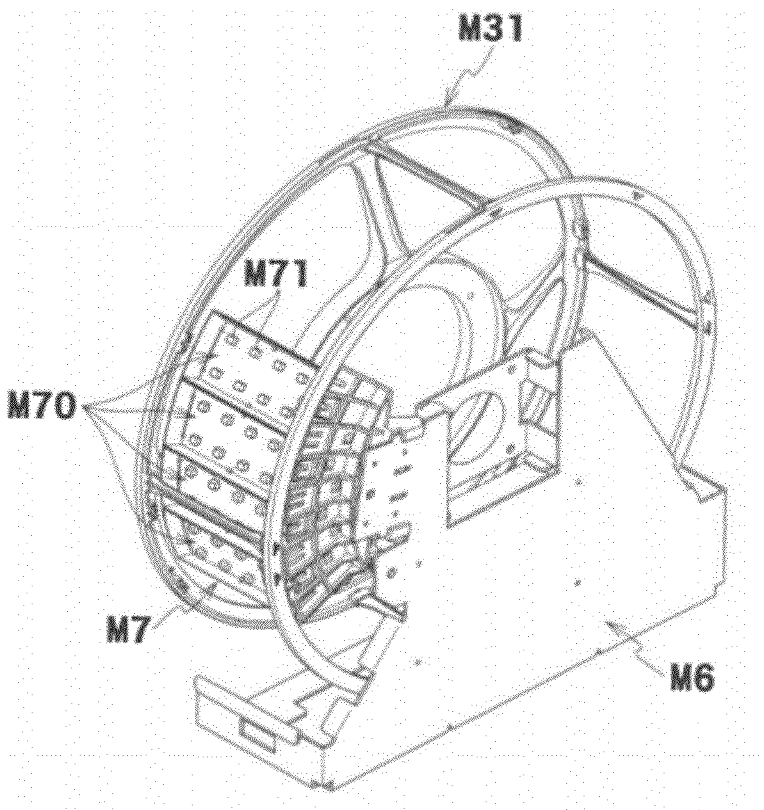
FIG. 6 is a perspective view of a reel frame and an illuminating device.
Figure 7:
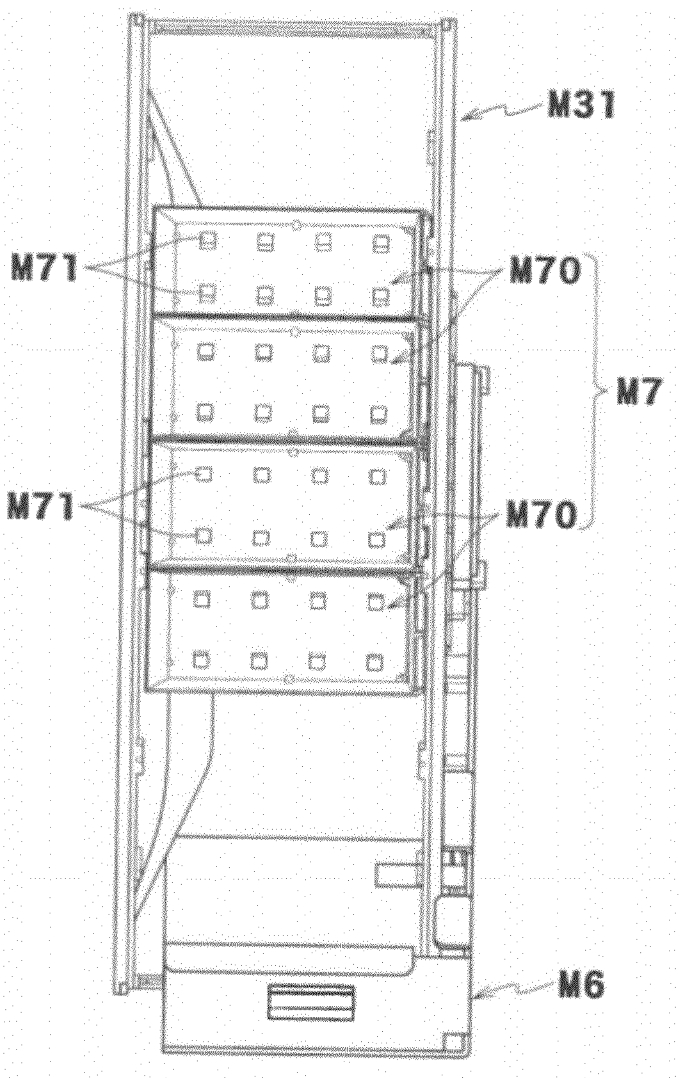
FIG. 7 is a front elevation of a reel frame and an illuminating device.

As shown in FIGS. 6 & 7, an illuminating device M7 is disposed within a space on an inner periphery side of the rotatable reel M3. The illuminating device M7 emits light from the inner periphery side of the rotatable reel M3 towards the reel band M32 and is disposed in such a way that light through the reel band M32 is observable from the outside of the gaming machine 10 through the display window 150.

Figure 8:
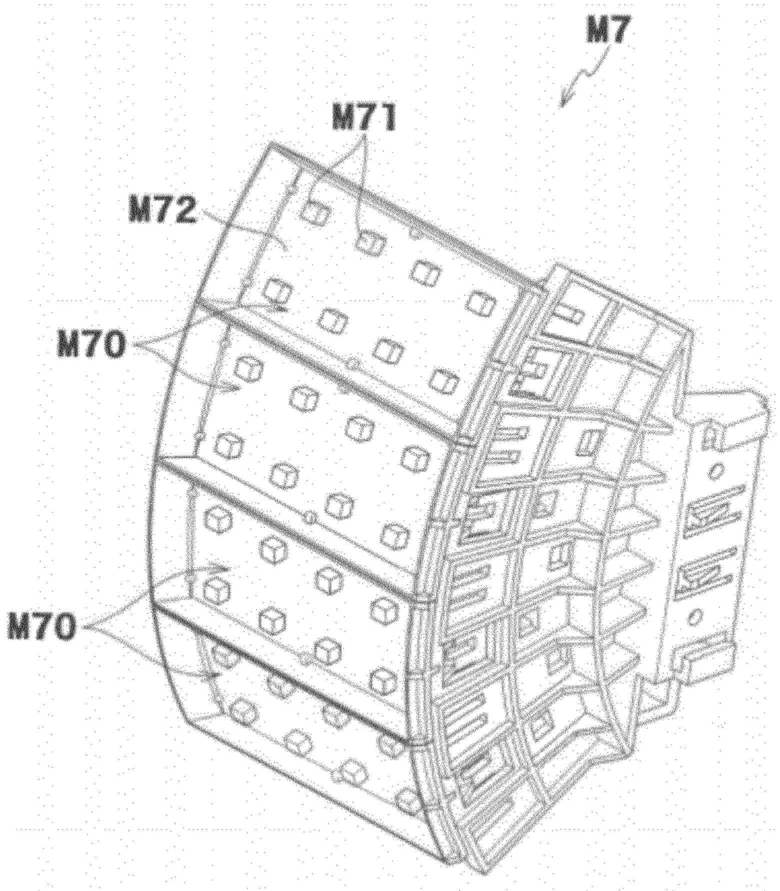
FIG. 8 is a perspective view of an illuminating device.

More particularly, as shown in FIG. 8, the illuminating device M7 has four light source units M70 arranged in the up and down direction. The light source units M70 are arranged to face the symbols 501; that is, the positional relationships of the light source units M70 and the symbols 501 are set to be in the radial direction of the rotatable reel M3. In this way, each of the light source units M70 is capable of illuminating the corresponding symbol 501, and it is possible for the emitted light to emit through the reel band M32 and the transparent reel frame M31.

Each of the light source units M70 is provided with a plurality of light sources M71 arranged in the width direction and the lengthwise direction of the reel band M32. The light sources M71 are able to change the light quantity of the emitted light to a plurality of levels. According to this feature, it is possible for the illuminating device M7 to control the lighting mode of each of the light sources M71 separately, thereby increasing the variety of illumination effects.

(Electrical Structure of Gaming Machine: Reel device M1)

Figure 9:
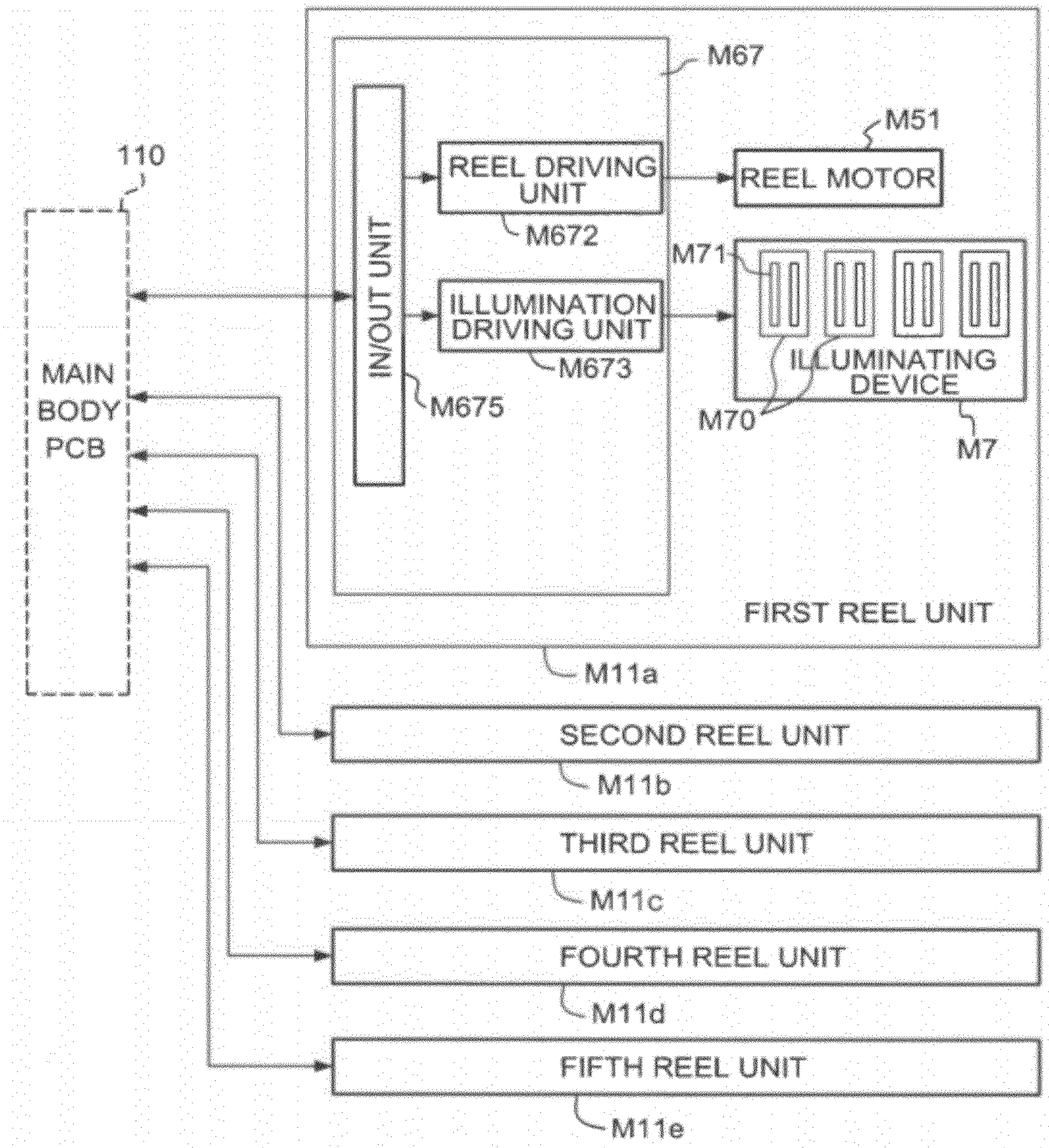
FIG. 9 is an electrical block diagram of a reel substrate.

The circuit of the gaming machine 10 includes a main body PCB (Printed Circuit Board) 110 which is connected to a motherboard (not shown) including a main CPU (Central Processing Unit). The motherboard corresponds to the game controller 100 of the present embodiment. The reel device M1 is connected to the main body PCB 110. As shown in FIG. 3, the reel device M1 has five reel units M11, the first to the fifth reel unit M11*a* to M11*e*. As shown in FIG. 9, each of the first to the fifth reel units M11*a* to M11*e* has a reel substrate M67. The reel substrate M67 has an in/out unit M675 communicatably connected to the main body PCB 110, a reel driving unit M672 connected to the in/out unit M675, and an illumination driving unit M673.

The reel driving unit M672 is connected to the reel motor M51, so as to supply driving power thereto. The illumination driving unit M673 is connected to each light source M71, so as to supply driving power thereto separately.

(Symbols, Combinations, and the Like)

The symbols 501 displayed on the rotatable reels M11*a* to M11*e* of the gaming machine 10 form symbol columns. Each symbol 501 forming a symbol column is given any one of the code Nos. 0 to 21 or more, as shown in FIG. 10. Each symbol column has a combination of symbols 501 which are: "JACKPOT 7," "FLAME 7," "CHANCE CHERRY," "WILD," "BELL," "CHERRY," "STRAWBERRY," "PLUM," "ORANGE," and "APPLE."

Any four consecutive symbols 501 of a symbol column are displayed (arranged) in the uppermost tier, the upper tier, the lower tier, and the lowermost tier of the corresponding one of the rotatable reels M11*a* to M11*e*, respectively, thereby forming a symbol matrix of five columns and four rows under the display window 150. Scrolling of symbols 501 forming a symbol matrix starts when a game is started at least by pushing the start button 46. The scrolling of the symbols 501 stops (rearrangement) after a predetermined period of time has elapsed since the scrolling began.

Further, various winning combinations are set beforehand for each symbol 501. A winning combination is a combination of symbols 501 stopped on the payline, which puts a player into an advantageous state. Examples of the advantageous state include: when a predetermined number of coins corresponding to the winning combination are paid out; when the number of coins to be paid out is added to a credit amount; when a bonus game is started; and the like.

Figure 12:
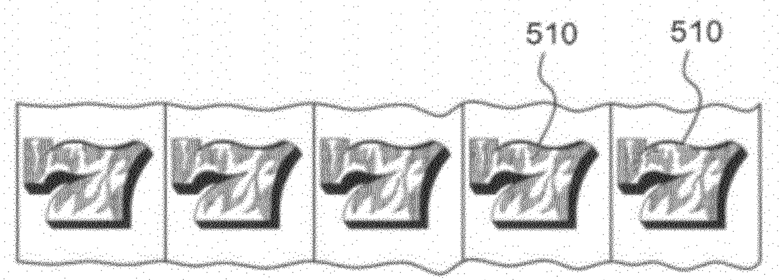
FIG. 12 is an explanatory diagram of an example of a winning combination.

In the embodiment, a winning combination is a combination of symbols 501 which is formed on an activated payline and includes a predetermined number of at least one kind of the following symbols 501: "FLAME 7," "APPLE," "PLUM," "BELL," "WILD," and "CHERRY." FIG. 12 is an example of a winning combination. Note that the "WILD" symbol is a symbol 501 which can substitute for any other type of symbol 501.

(Special Symbol 510)

The symbols 501 include a special symbol 510 having at least two translucent portions, including a first translucent portion 511 of a first color and a second translucent portion 512 of a second color. The first color and the second color are different and are selected in such a way that the special symbol 510 is observable as a symbol in one single color or a symbol with a pattern of at least two colors depending on the color of the emitted light.

Figure 11:
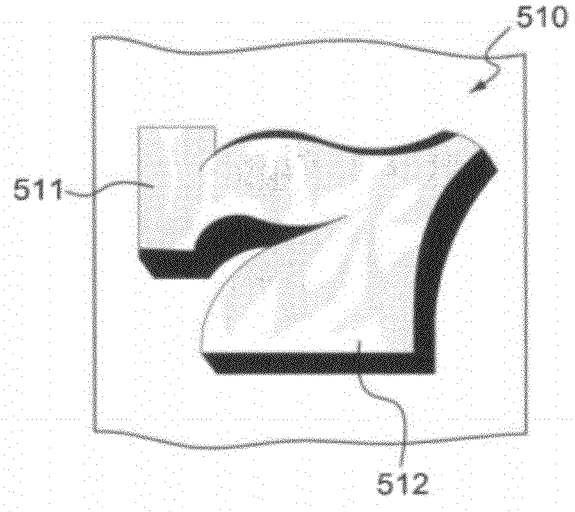
FIG. 11 is an explanatory view of a special symbol.

In the embodiment, as shown in FIG. 11, the special symbol 510 is the symbol "FLAME 7." The first color is red, and the second color is yellow. The first translucent portion 511 and the second translucent portion 512 form a flame pattern within the special symbol 510. Thereby, when the illuminating device M7 emits red light, the special symbol 510 is observed as a symbol in a single color which is red, and when the illuminating device M7 emits yellow light, the symbol 510 is observed as a symbol with a flame pattern of two different colors, which are yellow and red.

(Base Game Processing)

Figure 13:
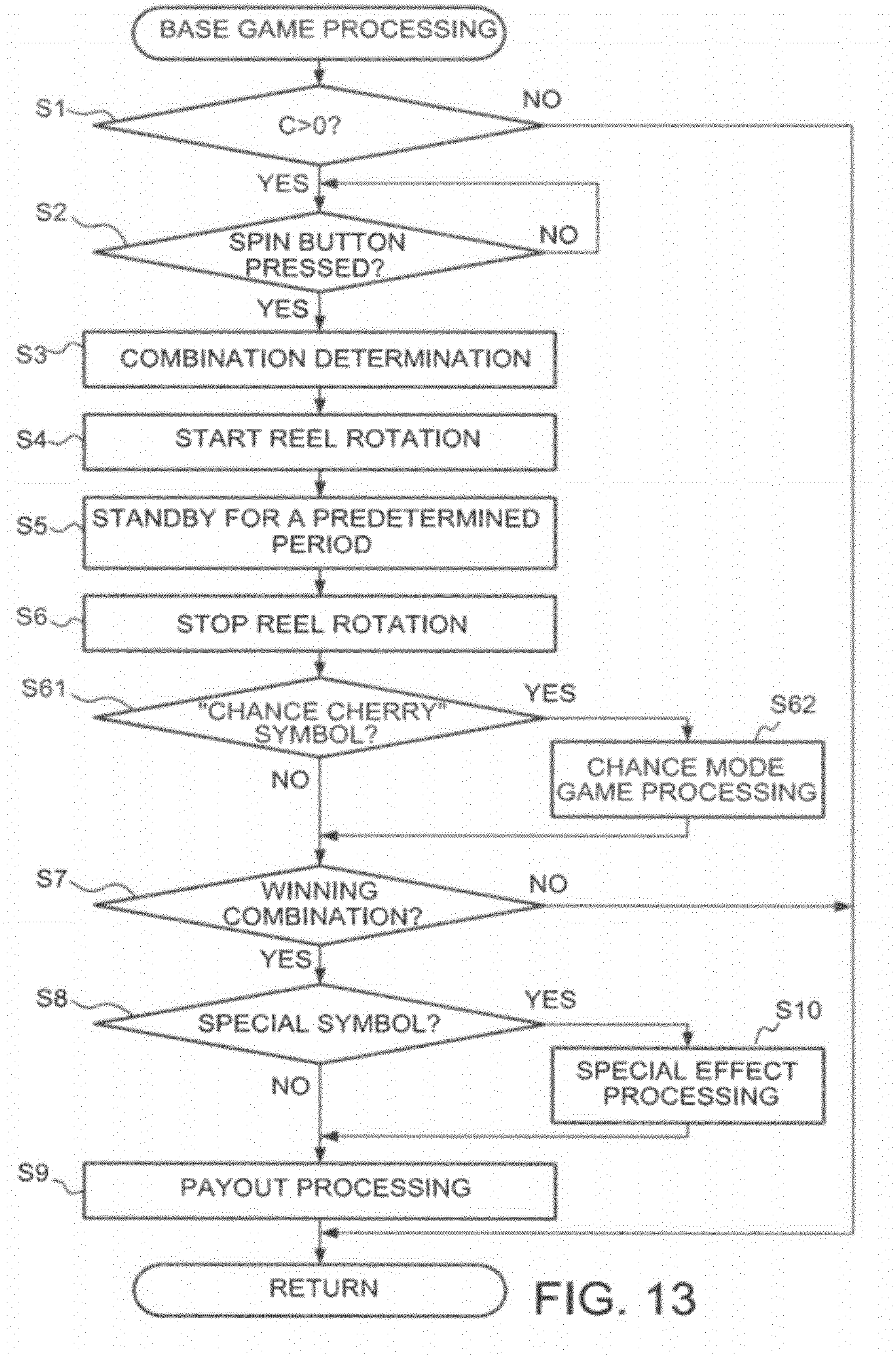
FIG. 13 is a flow chart of a base game process.

FIG. 13 is a flowchart of the base game processing for the gaming machine 10 according to an embodiment of the present invention.

First, it is determined whether the credit, which is the number of the coins inserted by the player, still remains (step S1). Specifically, the credit number C stored in the RAM is read out, and the process is performed on the basis of the credit number C. If the credit number C is "0" (step S1, NO), the game cannot be started, so the routine ends without any process performed. In the meantime, if the credit number C is greater than or equal to "1" (step S1, YES), it is determined that credit still remains, and the process proceeds to step S2.

In step S2, it is determined whether the spin button is pressed by the player. If the spin button is not pressed (step S2, NO), the step S2 is performed repeatedly so as to standby until the spin button is pressed. Then, when the spin button is pressed (step S2, YES), a combination determination process is performed (step S3).

In the combination determination process, the symbols 501 to be displayed through the display window 150 are determined on the basis of the random number generated by a random number generator. In the embodiment, the random number is generated by the random number generator provided outside the main CPU; however, the random number may also be generated by the arithmetic process of the main CPU without a random number generator being provided.

After performing the above combination determination process, each of the rotatable reels M3 is rotated so as to rearrange the symbols 501 displayed in the display window 150 (step S4). Then, after standby for a predetermined period (step S5), each of the rotatable reels M3 automatically stops rotating (step S6).

Next, the process first checks whether the symbols 501 stopped in the display window 150 include the "CHANCE CHERRY" symbol (step S61). If the "CHANCE CHERRY" symbol is displayed (step S61, YES), the process proceeds to step S62, in which a chance mode game is executed, and then proceeds to step S7. If not (step S61, NO), the process proceeds to step S7 directly.

In step S7, according to the result of the combination determination process in step S3 or step S62, it is determined whether the combination forms a winning combination. If the combination does not form a winning combination, the routine is terminated (step S7, NO). If the combination forms a winning combination (step S7, YES), the process further checks whether the winning combination formed includes a special symbol 510, which is "FLAME 7" in the embodiment (step S8). If there is no special symbol 510 in the winning combination (step S8, NO), the payout corresponding to the winning combination is awarded to the player (step S9). On the other hand, if the winning combination includes a special symbol 510 (step S8, YES), a special effect is performed (step S10) before proceeding to the payout process (step S9). Note that the special effect corresponds to a flaming effect in the embodiment. Finally, the routine is terminated after the payout is awarded to the player.

(Chance Mode Game Processing)

Figure 17:
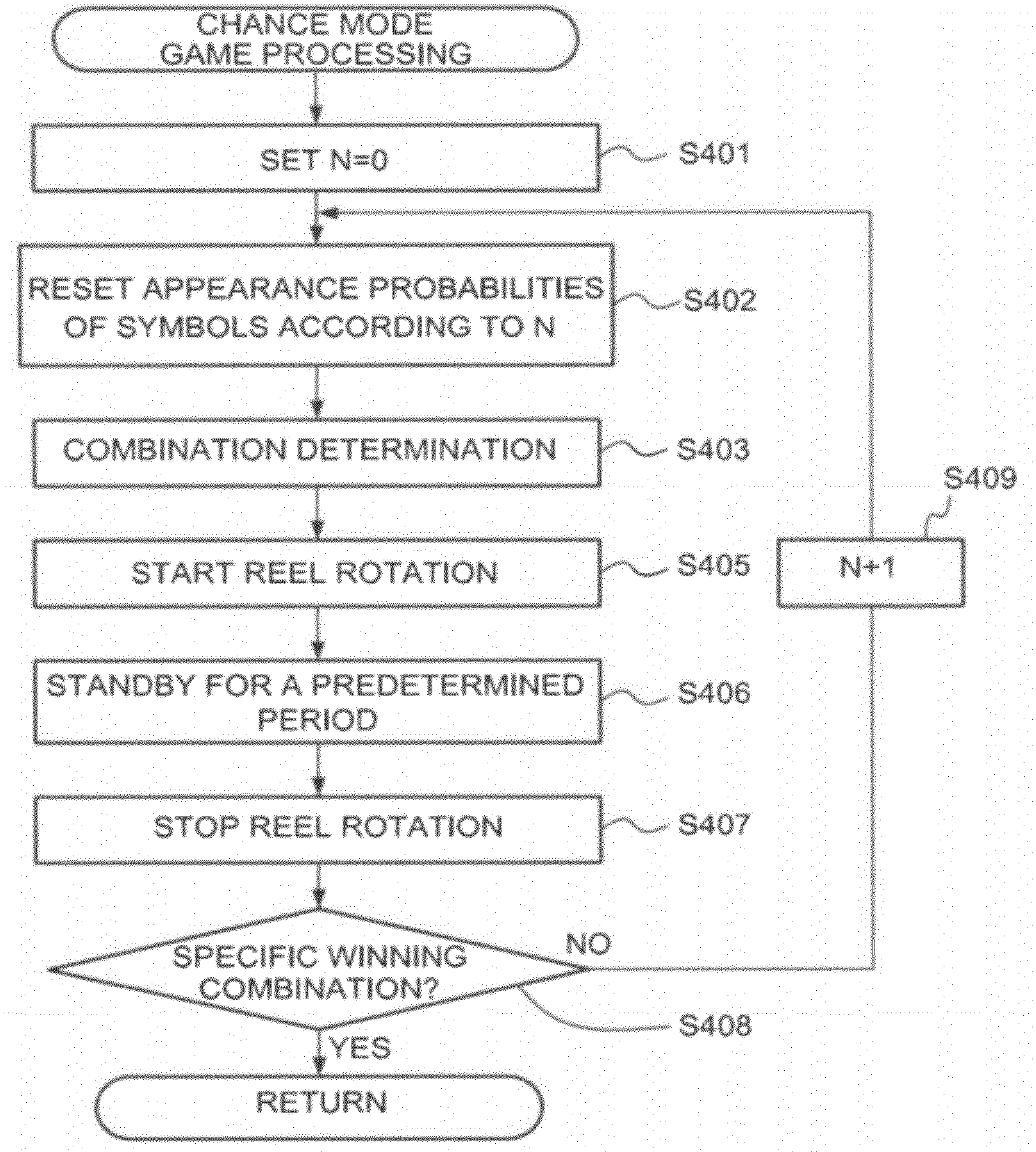
FIG. 17 is a flow chart of a chance mode game process.

As shown in FIG. 13, when the "CHANCE CHERRY" symbol stops in the display window 150 in the base game, the chance mode game is started (step S62). The chance mode game is a "continuous game" in which a unit game is executed once or more than once. And in the chance mode game of the embodiment, the probability of forming a winning combination contributed by the symbol "WILD" or "FLAME 7," which corresponds to relatively more payouts, is higher than that in the base game. Referring to FIG. 17, when entering the chance mode game, a counter N is initialized to 0 at first (step S401). The counter N stores the number of times that the unit game has been executed in the chance mode game. Next, the appearance probabilities of the symbols 501 are set to predetermined values corresponding to the counter N (step S402). More particularly, the appearance probabilities of the symbols "WILD" and "FLAME 7" are set to higher values than those in the base game when the value of the counter N is 0, e.g. the first unit game in the chance mode game. In the meantime, the appearance probability of the "CHERRY" symbol is set to 0. And when the counter N is greater than 0, the appearance probabilities of the specific symbols "CHERRY," "WILD," and "FLAME 7" are set to higher values than those in the previous unit game. Accordingly, the appearance probabilities of the specific symbols "CHERRY," "WILD," and "FLAME 7" become increasingly higher as the chance mode game continues.

Next, in step S403 to S407, symbols are rearranged in the same manner as step S3 to S6 of the base game process. After the rearrangement, the process proceeds to step S408, in which it is determined whether the combination displayed is one of the specific winning combinations which terminate the chance mode game. In the embodiment, the specific winning combinations are winning combinations including at least one "CHERRY" symbol, at least three "WILD" symbols, or at least three "FLAME 7" symbols. For example, if the combination displayed includes four "FLAME 7" symbols, which is a specific winning combination, the chance mode game is terminated (step S408, YES). On the other hand, if the combination displayed is not a specific winning combination (step S408, NO), the counter N is increased by 1 (step S409), and then the process goes back to step S402 to reset the appearance probabilities of the symbols, and the unit game is repeated. In the embodiment, when the counter N is 7, i.e. the eighth unit game, the appearance probabilities of the symbols 501 are set in such a way that the combination determined in step S403 will definitely be a specific winning combination. That is, the chance mode game will terminate in the eighth unit game.

According to the process described above, the winning combinations corresponding to more payouts are formed more easily in the chance mode game than in the base game. And the probability of forming the specific winning combination becomes higher each time the unit game is repeated. The chance mode game is a "continuous game" which is constituted by 1 to 8 unit games and is terminated when a specific winning combination is formed. Note that the specific winning combination is definitely formed in the eighth unit game.

(Payout Processing)

Figure 18:
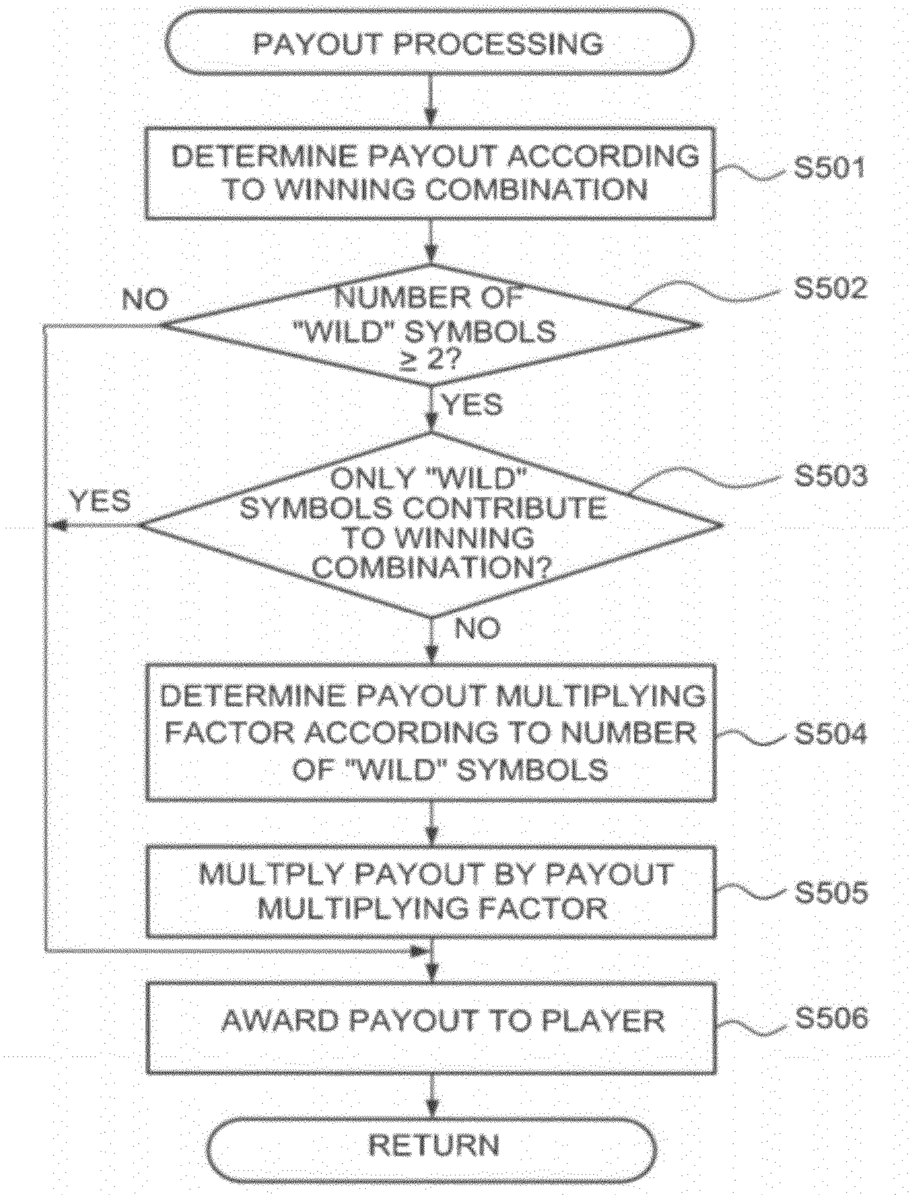
FIG. 18 is a flow chart of a payout process.

In some embodiments, the payout is multiplied by a payout multiplying factor according to the number of "WILD" symbols arranged in the winning combination. As shown in FIG. 18, first, the payout is determined according to the winning combination (step S501). Next, a check is performed as to whether the number of "WILD" symbols arranged in the winning combination is greater than or equal to a predetermined number, which is "2" in the embodiment (step S502). If the number of "WILD" symbols in the winning combination is less than "2" (step S502, NO), the process proceeds to step S506. On the other hand, if the number of the "WILD" symbols in the winning combination is greater than or equal to "2" (step S502, YES), the process proceeds to step S503. In step S503, a further check is performed as to whether the symbols 501 which contribute to the winning combination include only the "WILD" symbols; if this is the case, the payout will not be multiplied (step S503, YES). For example, if there are 5 "WILD" symbols arranged in the winning combination, which means no other type of symbol contributes to the winning combination, the payout remains a fixed payout set in step S501. Note that the payout corresponding to the winning combination of 5 "WILD" symbols is the top payout in the embodiment. If the symbols 501 which contribute to the winning combination include other types of symbols than the "WILD" symbols, the payout will be multiplied by a payout multiplying factor (step S503, NO).

In step S504, the payout multiplying factor is determined based on the number of "WILD" symbols arranged in the winning combination. In the embodiment, the payout multiplying factor is set to the number of "WILD" symbols arranged in the winning combination. For example, if there are 2 "WILD" symbols arranged in the winning combination, the payout multiplying factor is set to "2," and if there are 3 "WILD" symbols, the payout multiplying factor is set to "3." In step S505, the payout is multiplied by the payout multiplying factor determined in step S504. According to the above processes, the payout is multiplied by the number of "WILD" symbols. That is, the payout is doubled when there are 2 "WILD" symbols and is tripled when there are 3 "WILD" symbols arranged in the winning combination. At the end of the payout process, the payout is awarded to the player (step S506).

According to the payout processing of the embodiment described above, when a winning combination is displayed on an activated payline, a predetermined fixed payout amount corresponding to the winning combination is related to the winning combination, and the fixed payout amount is multiplied according to the number of "WILD" symbols within the symbols 501 forming the winning combination, and the final payout amount is determined by calculation.

For example, when a winning combination of 5 "CHERRY" symbols is displayed, the payout amount is 60. But if there are 2 "CHERRY" symbols substituted by the "WILD" symbols, the payout amount becomes 120. Moreover, in the chance mode game of the embodiment described above, the appearance probability of the "WILD" symbol differs from that in the base game. That is, the probability of winning a higher payout amount when the winning combination is formed in the chance mode game is also increased.

According to the embodiment described above, a gaming machine described below is provided.

The gaming machine comprises a symbol display unit displaying a plurality of symbols including "WILD" symbols that substitute as symbols contributing to a winning combination, program data for executing a game with data controlling an appearance probability of the symbols, a memory device storing various kinds of data, including data for determining a fixed payout amount according to the number of symbols contributing to the winning combination and the "WILD" symbols displayed on a certain payline and data for multiplying the fixed payout amount according to the number of "WILD" symbols existing within the plurality of symbols contributing to the winning combination, and a CPU executing a "continuous game" that reads out the various kinds of data stored in the memory device, executes a regular game on the basis of the various kinds of data read out, and executes a game which sets the appearance probability of the specific symbols to a higher value according to the game result of the regular game. The CPU determines whether the number of symbols contributing to a winning combination and the "WILD" symbols form a winning combination. If a winning combination is formed, the gaming machine extracts a multiple corresponding to the number of "WILD" symbol within the symbols contributing to the winning combination, and data of a fixed payout amount predetermined for each winning combination respectively. The gaming machine awards a payout of an amount calculated by multiplying the fixed payout amount extracted from the memory device by the multiple extracted from the same memory device.

(Reel Effect by Illuminating Device M7)

The gaming machine 10 of the embodiment is configured in a way that the plurality of light sources M71 in the illuminating device M7 are separately controllable.

Specifically, the gaming machine 10 has a rotatable reel M3 having a transparent reel band M32 and symbols 501 being arranged on the reel band M32, a reel driving mechanism M5 for rearranging the symbols 501 by driving the rotatable reel M3, an illuminating device M7 disposed in a way that the emitted light through the reel band M32 is observable from the outside, and an illumination controller controlling the lighting mode (light quantity, color, emitting interval, emitting timing, and the like) of the emitted light which is emitted from the illuminating device M7. The illuminating device M7 has a plurality of light sources M71 being arranged in the width and the lengthwise direction of the reel band M32 and being controllable to change the light quantity of the emitted light to a plurality of levels. More particularly, the light sources M71 are LEDs (Light Emitting Diodes) arranged as a matrix in the embodiment. The illumination controller is capable of controlling the plurality of light sources M71 separately.

Specifically, the illumination controller controls the plurality of light sources M71 in such a way that the light quantity (or brightness level) is increased or decreased sequentially in the rotation direction or the reverse direction of the rotatable reel M3.

The light sources M71 are also controlled in such a way that the color of the emitted light is changed sequentially in the rotation direction or the reverse direction of the rotatable reel M3.

The light sources M71 are also controlled in such a way that the speed of changing the color (or brightness level) sequentially is set in accordance with the rotation speed of the rotatable reel M3.

(Special Effect Processing)

Figure 14:
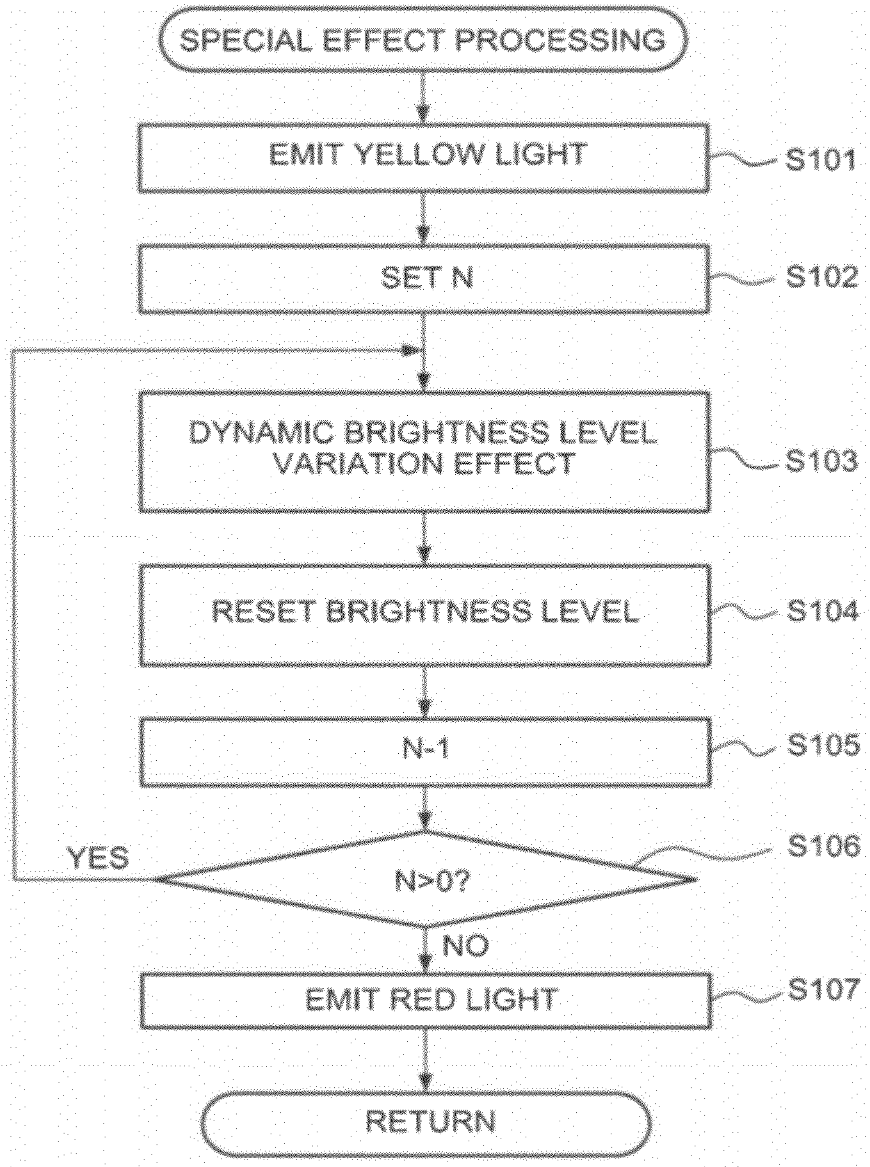
FIG. 14 is a flow chart of a special effect process.

As shown in FIG. 13, when the symbols 501 stopped in the display window 150 form a winning combination which includes a special symbol 510, the special effect is performed. In the embodiment, the illuminating device M7 starts emitting white light when the reel rotation is started. Then, in the special effect process, as shown in FIG. 14, the illuminating device M7 changes the color of the emitted light to yellow (step S101), which is the same color as the second portion of the special symbol 510 "FLAME 7." At this point, a flame pattern including red and yellow portions is observed within the special symbol 510 "FLAME 7."

Next, the counter N stored in the RAM is set to a predetermined number of times to repeat the effect (step S102). Then, in step S103, the brightness level of the emitted light is increased from an original level to a predetermined higher level sequentially in the rotation direction of the rotatable reel M3 with a predetermined interval. More particularly, the brightness levels of the emitted light emitted from the uppermost row of the light sources M71 are first increased, and the brightness level of the next row of the light sources M71 is then increased after a predetermined interval. The brightness level variation of the following rows of the light sources M71 are manipulated in the same way. Accordingly, the brightness level of the emitted light is increased from the upper side to the lower side dynamically.

Next, the brightness levels of all light sources M71 are reset to the original level (step S104). Then, the counter N stored in the RAM is decreased by 1 (step S105) and the process proceeds to step S106.

In step S106, it is determined whether the counter N is greater than "0." If the counter N is greater than "0" (step S106, YES), the process goes back to step S103 so as to repeat the dynamic brightness level variation effect. If the counter N is not greater than "0" (step S106, NO), then the process proceeds to step S107.

According to the above illumination effect, a flaming effect is performed within the special symbol 510 "FLAME 7."

In step S107, all of the light sources M71 emit red light, so that the special symbol 510 "FLAME 7" is observed as a symbol in a single color, which is red in the embodiment. Specifically, the first translucent portion 511 of the first color, which is red in the embodiment, still appears to be red, while the second translucent portion 512 of the second color, which is yellow in the embodiment, appears to be red with the red emitted light.

Accordingly, at the end of the special effect process, all of the special symbols 510 "FLAME 7" in the winning combination appear to be in red, so that the winning combination is easily recognized by the player.

Modification 1

Figure 15:
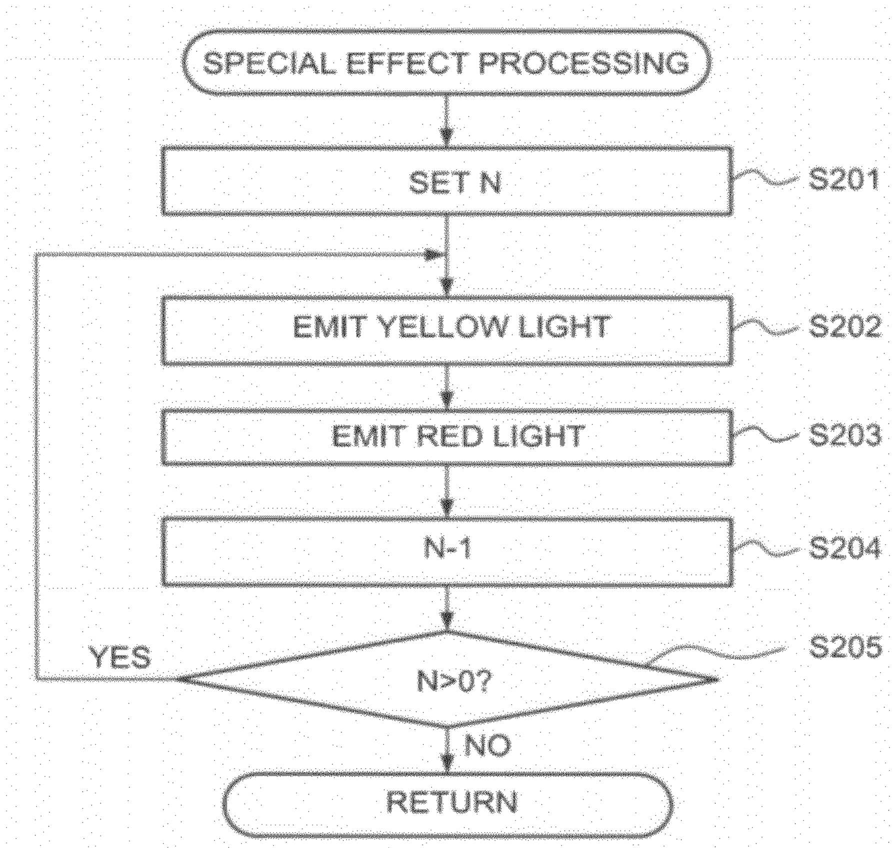
FIG. 15 is a flow chart of a modification of the special effect process.

In the above embodiment, the special effect is carried out by performing the dynamic brightness level variation effect. However, the present invention is not limited to this. FIG. 15 is a flowchart of a modification of the special effect processing.

First, in step S201, the counter N stored in the RAM is set to a predetermined number of times to repeat the effect. Next, the color of the emitted light is changed to yellow (step S202). At this point, the special symbol 510 "FLAME 7" is observed as a symbol with a flame pattern of two different colors, which are red and yellow.

Then, after a predetermined elapsed time, the color of the emitted light is changed to red (step S203), so that the special symbol 510 "FLAME 7" is observed as a symbol in a single color, which is red.

Next, the counter N is decreased by 1 (step S204). After that, it is determined whether the counter N is greater than "0" (step S205). If the counter N is greater than "0" (step S205, YES), the process goes back to step S202 to repeat the effect. If the counter N is not greater than "0" (step S205, NO), the special effect process is terminated.

According to the above process, by switching the color of the emitted light between yellow and red repeatedly, the flame pattern in the special symbol 510 appears and disappears alternatively, so that a dynamic flaming effect is performed within the special symbol 510 "FLAME 7."

Modification 2

Further, another modification of the special effect processing is also provided. The dynamic brightness level variation effect in the above embodiment is modified to a dynamic color variation effect, in which the color of the emitted light of the light sources M71 is changed sequentially in the rotation direction, instead of increasing the brightness level.

Figure 16:
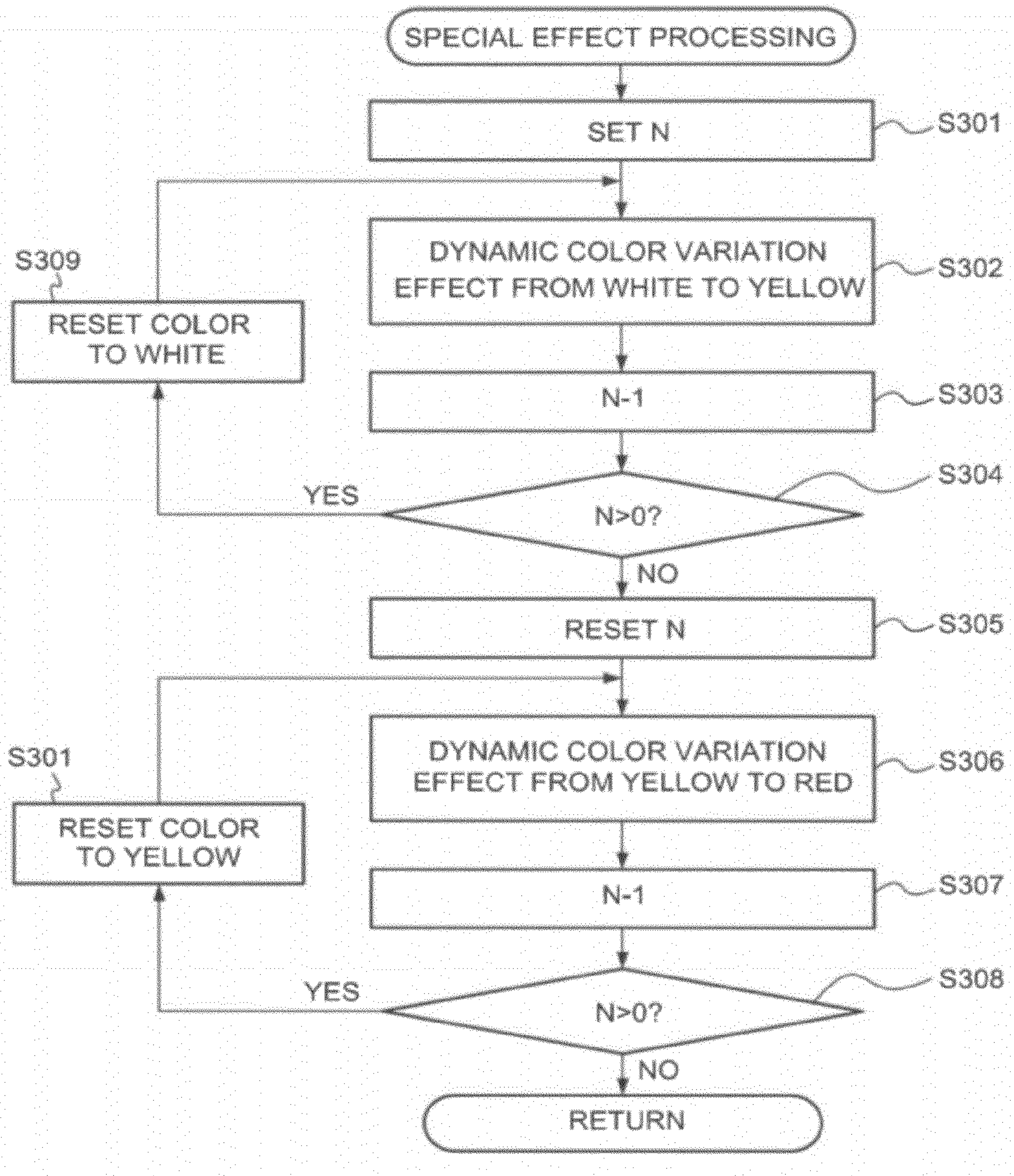
FIG. 16 is a flow chart of another modification of the special effect process.

As shown in FIG. 16, in step S301, the counter N stored in the RAM is set to a predetermined number of times to repeat the effect.

Then, in step S302, the color of the emitted light is switched from white to yellow sequentially in the rotation direction of the rotatable reel M3 with a predetermined interval. More particularly, the color of the emitted light emitted from the uppermost row of the light sources M71 is first changed, and the color of the next row of the light sources M71 is then changed after a predetermined interval. The color switching of the following rows of the light sources M71 is manipulated in the same way. Accordingly, the color of the emitted light is changed from the upper side to the lower side dynamically.

Next, the counter N is decreased by 1 (step S303). After that, it is determined whether the counter N is greater than "0" (step S304). If the counter N is greater than "0" (step S304, YES), the color of the emitted light of all light sources M71 is reset to white (step S309), and then the process goes back to step S302 to repeat the effect. If the counter N is not greater than "0" (step S304, NO), the process proceeds to step S305, in which the counter N is reset to the predetermined number of times to repeat the effect.

Next, in step S306, an effect similar to that in step S302 is performed. The only difference is that the color of the emitted light changes from yellow to red, instead of changing from white to yellow.

Then, the counter N is decreased by 1 (step S307). After that, it is determined whether the counter N is greater than "0" (step S308). If the counter N is greater than "0" (step S308, YES), the color of the emitted light of all light sources M71 are reset to yellow (step S310), and then the process goes back to step S306 to repeat the effect. If the counter N is not greater than "0" (step S308, NO), the special effect process is terminated.

According to the above process, an dynamic flaming effect is produced.

The above embodiment thus described solely serves as a specific example of the present invention, and the present invention is not limited to such an example. Specific structures and various means may be suitably designed or modified. Further, the effects of the present invention described in the above embodiment are not more than examples of most preferable effects achievable by the present invention. The effects of the present invention are not limited to those described in the embodiments described above. For example, effect procedures, colors of emitted light or the like mentioned in the present embodiment and modifications 1 and 2 are no more than examples Further, the detailed description above mainly focuses on characteristics of the present invention to facilitate understanding. The present invention is not limited to the above embodiments, and is applicable to a diversity of other embodiments. Further, the terms and phraseology used in the present specification are adopted solely to provide specific illustration of the present invention, and in no case should the scope of the present invention be limited by such terms and phraseology. Further, it will be obvious for those skilled in the art that other structures, systems, methods or the like are possible, within the spirit of the invention described in the present specification. The description of claims therefore shall encompass structures equivalent to the present invention, unless such structures are regarded as departing from the spirit and scope of the present invention. Further, the abstract is provided to allow, through simple investigation, quick analysis of the technical features and essence of the present invention by an intellectual property office, a general public institution, or one skilled in the art who is not fully familiar with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to documents already available. The detailed description of the present invention provided hereinabove includes a process executed on a computer. The above descriptions and expressions are provided to allow one skilled in the art to most efficiently understand the present invention. A process executed in or by respective steps yielding one result or blocks with a predetermined processing function described in the present specification shall be understood as a process with no self-contradiction. Although the present specification occasionally personifies the processes executed in the steps or blocks, these processes are essentially executed by various devices. Further, the other structures necessary for the steps or blocks are obvious from the above descriptions.

LIST OF REFERENCE NUMERALS

10 Gaming machine
150 Display window
501 Symbol
510 Special Symbol
511 First translucent portion
512 Second translucent portion
M1 Reel device
M3 Rotatable Reel
M5 Reel driving mechanism
M6 Reel support mechanism
M7 Illuminating device
M11 Reel unit
M11*a*~M11*e* First~Fifth reel unit
M12 Reel unit holding mechanism
M31 Reel frame
M32 Reel band
M51 Reel motor
M70 Light source unit
M71 Light source

What is claimed is:

1. A gaming machine comprising:

a game controller; and a mechanical symbol display unit controlled by said game controller for displaying a plurality of symbols in such a way that a combination of said symbols randomly selected by said game controller is displayed through a display window and, when said combination of said symbols is a predetermined winning combination, a player is awarded, said mechanical symbol display unit including a rotatable reel having a peripheral face with a plurality of said symbols spaced apart peripherally thereon and being controllable to stop to display at least one of said symbols through said display window, an illuminating device provided within a space on an inner periphery side of said rotatable reel, being controllable to emit light of at least two different colors including a first color and a second color different from said first color, and an illumination controller switching said illuminating device to emit light of said first color and said second color at a predetermined timing, wherein said symbols disposed on said peripheral face of said rotatable reel include a special symbol including at least two translucent portions, which prior to illumination by said illumination device, include a first translucent portion of said first color and a second translucent portion of said second color, said first and second translucent portions configured to transmit light from said illumination device therethrough, and whereby when the color of light emitted from said illumination device is determined selectively, said special symbol stopped in said display window transmits light from said illumination device through said first and second translucent portions such that said special symbol is observable through said display window as at least one of a symbol in substantially a same single color as said determined color of emitted light, or a symbol with a pattern of at least two colors, according to a combination of said determined color of emitted light and the colors of said at least two translucent portions of said special symbol.

2. A gaming machine comprising:

a game controller; and a mechanical symbol display unit controlled by said game controller for displaying a plurality of symbols in such a way that a combination of said symbols randomly selected by said game controller is displayed through a display window and, when said combination of said symbols is a predetermined winning combination, a player is awarded, said mechanical symbol display unit includes including a rotatable reel having a peripheral face with a plurality of said symbols spaced apart peripherally thereon and being controllable to stop to display at least one of said symbols through said display window, an illuminating device provided within a space on an inner periphery side of said rotatable reel, being controllable to emit light of at least two different colors including a first color and a second color different from said first color, and an illumination controller switching said illuminating device to emit light of said first color and said second color at a predetermined timing, wherein said symbols include a special symbol including at least two translucent portions including a first translucent portion of said first color and a second translucent portion of said second color, whereby when the color of emitted light is determined selectively, said special symbol stopped in said display window is observable through said display window as a symbol in substantially the same single color as said determined color of emitted light or a symbol with a pattern of at least two colors, according to a combination of said determined color of emitted light and the colors of said at least two translucent portions, and wherein said illuminating device is controllable to emit white light in addition to said first color and said second color, and said illumination controller is configured to (a) emit white light when a game has started and a plurality of said rotatable reels are rotating, (b) change said color of emitted light from white to the color with which said special symbol is displayed in a pattern of at least two colors when a plurality of said rotatable reels stop and a combination of symbols including said special symbol displayed through said display window is a winning combination, and (c) thereafter, change said color of emitted light to a color with which said special symbol is displayed in a single color.

3. The gaming machine according to claim 2, wherein the size of each of said symbols is sufficiently small for a plurality of said symbols aligned along the direction of rotation to be observable within the display window at any given time, said illuminating device includes a plurality of emitting modules corresponding to each of said plurality of said symbols displayed through said display window, and is controllable to change the color of emitted light for each symbol by controlling said plurality of emitting modules to change the color of emitted light respectively by said illumination controller.

4. The gaming machine according to claim 2, wherein said illuminating device includes at least one LED group controllable to emit at least light of said first color, said second color, and white, the change of color in (b) and (c) is controlled to change sequentially in said rotating direction of said rotatable reel within said plurality of emitting modules repeatedly.

5. The gaming machine according to claim 4, wherein said at least one LED group is arranged as a matrix.

6. The gaming machine according to claim 2, wherein said illuminating device is controllable to change brightness level of emitted light.

7. The gaming machine according to claim 2, wherein said first color is red, said second color is yellow, and said first translucent portion and said second translucent portion form a flame pattern within said special symbol.

8. A method of controlling a gaming machine including a game controller and a mechanical symbol display unit, said mechanical symbol display unit including a rotatable reel having a peripheral face with a plurality of symbols spaced apart peripherally thereon, an illuminating device within a space on an inner periphery side of said rotatable reel, and an illumination controller, wherein said symbols disposed on said peripheral face of said rotatable reel include a special symbol including at least two translucent portions, which prior to illumination by said illumination device, include a first translucent portion of a first color and a second translucent portion of a second color different from said first color, said first and second translucent portions configured to transmit light from said illumination device therethrough, the method comprising the steps of:

displaying a plurality of symbols in such a way that a combination of symbols randomly selected by said game controller is displayed through a display window by stopping said reel;

awarding a player when said combination of symbols is a predetermined winning combination;

emitting light of at least two different colors including said first color and said second color;

switching said illuminating device to emit light of said first color and said second color at a predetermined timing; and selectively determining the color of light emitted by said illumination device and transmitted through said first and second translucent portions such that said special symbol stopped in said display window is observable through said display window as at least one of a symbol in a same single color as said determined color of emitted light, or a symbol with a pattern of at least two colors, according to a combination of said determined color of emitted light and the colors of said at least two translucent portions of said special symbol.

9. A method of controlling a gaming machine including a game controller and a mechanical symbol display unit, said mechanical symbol display unit including a rotatable reel having a peripheral face with a plurality of said symbols spaced apart peripherally thereon, an illuminating device within a space on an inner periphery side of said rotatable reel, and an illumination controller, wherein said symbols include a special symbol including at least two translucent portions including a first translucent portion of a first color and a second translucent portion of a second color different from said first color, the method comprising the steps of:

displaying a plurality of symbols in such a way that a combination of symbols randomly selected by said game controller is displayed through a display window by stopping said reel;

awarding a player when said combination of symbols is a predetermined winning combination;

emitting light of at least two different colors including said first color and said second color;

switching said illuminating device to emit light of said first color and said second color at a predetermined timing; and determining the color of emitted light selectively, so that said special symbol stopped in said display window is observable through said display window as a symbol in the same single color as said determined color of emitted light or a symbol with a pattern of at least two colors, according to a combination of said determined color of emitted light and the colors of said at least two translucent portions, wherein said illuminating device is controllable to emit white light in addition to said first color and said second color, and said method further comprises the steps of:

(a) emitting white light when a game has started and a plurality of said rotatable reels are rotating;

(b) changing the color of emitted light from white to a color with which said special symbol is displayed in a pattern of at least two colors when a plurality of said rotatable reels stop and a combination of symbols including said special symbol displayed through said display window is a winning combination; and (c) thereafter, changing said color of emitting light to a color with which said special symbol is displayed in a single color.

10. The method according to claim 9, wherein the size of each of said symbols is sufficiently small for a plurality of said symbols aligned along the direction of rotation to be observable within the display window at any given time, said illuminating device includes a plurality of emitting modules corresponding to each of said plurality of said symbols displayed through said display window, and said method further comprises:

controlling said illuminating device to change the color of emitted light for each symbol by controlling said plurality of emitting modules to change the color of emitted light respectively by said illumination controller.

11. The method according to claim 9, wherein said illuminating device includes at least one LED group controllable to emit at least light of said first color, said second color, and white, said method further comprises:

controlling the color change in said steps (b) and (c) to change sequentially in said rotating direction of said rotatable reel within said plurality of emitting modules repeatedly.

12. The method according to claim 11, wherein said at least one LED group is arranged as a matrix.

13. The method according to claim 9, further comprising: controlling said illuminating device to change brightness levels of emitted light.

14. The method according to claim 9, wherein said first color is red, said second color is yellow, and said first translucent portion and said second translucent portion form a flame pattern within said special symbol.

* * * * *